May 10, 1955  M. S. SHAUB ET AL  2,707,988
INFANT SACK FOR STROLLERS AND THE LIKE
Filed Jan. 21, 1954
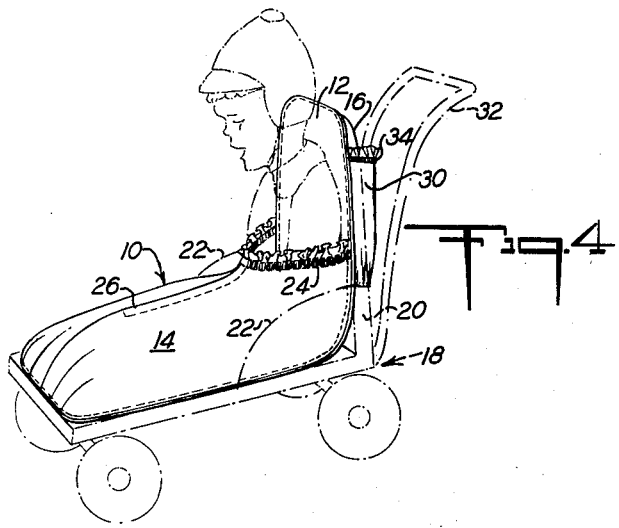
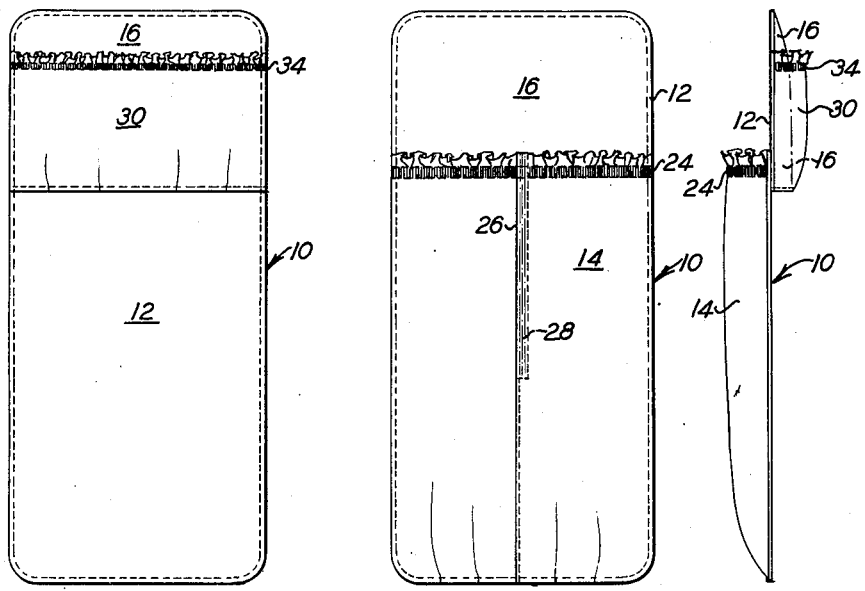
INVENTOR
MARY S. SHAUB
OLIVE H. SCARBOROUGH
BY
ATTORNEY ns Patent Office
2,707,988
Patented May 10, 1955

2,707,988

INFANT SACK FOR STROLLERS AND THE LIKE

Mary S. Shaub and Olive H. Scarborough, York, Pa.

Application January 21, 1954, Serial No. 405,333

2 Claims. (Cl. 155—189)

This invention relates to improvements in an infant sack for use with strollers, baby carriages and the like having an upstanding back to which said sack is readily attachable. Sacks for holding infants have long been known and used, these sacks primarily comprising a single pocket into which the infant is inserted. Such sacks have not been found to be practical for use in strollers, baby carriages and the like, particularly when it is desired to place the infant in the stroller or carriage in a sitting position. This is because it is difficult to strap or otherwise secure the infant and sack in the stroller or carriage seat so as to maintain the same in the desired position during use.

Infants characteristically wiggle and slide in strollers and baby carriages and no means known heretofore have permitted the sack to be positioned accurately and securely relative to the stroller or baby carriage. If no sack is used, the problem of keeping an infant wrapped with a blanket or robe within a stroller or baby carriage is even greater than when a sack is used because the wiggling of the infant and jostling of the stroller or carriage usually results in the blanket or robe becoming unwrapped and hanging from the stroller or carriage, usually dragging upon the ground.

The present invention provides a sack which circumvents the shortcomings of previously used means for covering an infant and attempting to hold it within a stroller or carriage, said invention including means comprising part of the sack which securely fits over the upstanding back of a stroller or carriage so as accurately to hold the sack in the desired position within the seat portion of said stroller or carriage. Further, the sack snugly and comfortably holds the infant therein and wiggling or sliding of the infant or jostling of the stroller or carriage will not substantially displace the sack from its desired position.

In addition, the present invention provides means for facilitating the positioning of an infant within the sack and additional means also are included to form a pocket on the rear of the upstanding back of the stroller or carriage in which baby necessities or other packages may be carried conveniently and effectively.

Still further, the sack comprising the invention is simple and inexpensive in construction, fool-proof in use and capable of long life.

Other advantages and characteristics of the invention, as well as details thereof, are set forth in the following specification and illustrated in the accompanying drawings comprising a part thereof.

In the drawings,

Fig. 1 is a front view of an infant sack embodying the principles of the present invention.

Fig. 2 is a rear view of the infant sack shown in Fig. 1.

Fig. 3 is a side elevation of the infant sack shown in Figs. 1 and 2.

Fig. 4 is a perspective view of the infant sack shown in the foregoing figures illustrated in an exemplary use thereof within an infant stroller, showing said sack attached to the back of said stroller and also illustrating an infant positioned within the sack.

Referring to the drawings, the sack 10 comprises a main panel 12 to one surface of which an infant receiving pocket 14 is attached and to the other surface of which a pocket 16 is attached for receiving the upstanding back of a stroller or carriage. The panel 12 and the pockets 14 and 16 are formed from any suitable flexible material such as woven or felted fabric, flexible sheet plastic, or the like. Depending upon the finish desired, a wide range of suitable flexible fabrics or sheet plastic material are available. Corduroy or flannel are highly suitable for such use.

The pockets 14 and 16 on the opposite surfaces of panel 12 respectively comprise panels of material preferably similar to said main panel 12 and the same are attached thereto respectively at the side edges and one end, by stitching or otherwise, to the side edges and opposite ends of the main panel 12. Thus, the pockets 14 and 16 open toward each other. Preferably, back receiving pocket 16 is substantially shorter than the infant receiving pocket 14. The pocket 14 also is formed so as to have considerable fullness for purposes of receiving an infant clothed bulkily such as in a snow suit or wrapped in blankets. The closed ends of pockets 14 and 16 are at opposite ends of the main panel 12.

Fig. 4 illustrates the sack 10 in use in an exemplary stroller 18 shown in broken lines and having an upstanding back 20. The back receiving pocket 16 is preferably of such dimensions that it snugly receives the back 20 of the stroller, baby carriage or otherwise, when the pocket is slipped downward over the upper end of said back 20. If desired, elastic may be attached to the outer end of pocket 16 to insure snug engagement with back 20. This effectively positions the sack 10 relative to the entire stroller. Usually, strollers have sides 22 to prevent excessive lateral movement of an infant when seated therein and such sides further facilitate the positioning of the sack.

In the preferred embodiment of the invention, the upper or open end of pocket 14 is provided with an elastic band 24, enclosed within a suitable elongaged pocket, seam or otherwise, for purposes of elastically constricting the open end of the infant receiving pocket 14. This facilitates maintaining the infant in desired position within the sack when in use. Inasmuch as the sack preferably is made of suitable fabric, such as woven cloth or otherwise, the sack readily conforms to the shape of the infant and the stroller or carriage within which the infant is positioned.

To facilitate the positioning of an infant within the pocket 14, the same is provided with a slit 26 extending longitudinally downward from the open end of said pocket and said slit is provided with suitable closing means such as a zipper 28, which holds the slit closed after the infant has been inserted within the pocket 14.

In order that the sack 10 may provide maximum usefulness, a third pocket 30 is provided so as to overlap the back receiving pocket 16 but said pocket opens in an opposite direction to the pocket 16 as clearly shown in Figs. 2 and 4. This third pocket 30 opens upwardly in use as shown especially in Fig. 4 and may be used to retain baby items or other packages within ready accessibility to the person operating the stroller or baby carriage. If desired, the same stitching used to attach pocket 16 to the side edges of panel 12 may be used to secure the side edges of pocket 30 thereto. It will be be seen from Fig. 4 that the upper or open end of pocket 30 is positioned closely to the handle 32 of the stroller so as to be convenient for use. The pocket 30 also preferably is made from material similar to the other portions of the sack and the dimensions thereof are such as to provide ample storage space. The upper end of the pocket 30 also preferably has an elastic band 34 which constricts the opening of the pocket so as more effectively to retain items therein.

When not in use, the sack 10 may be folded into a compact bundle while being stored inasmuch as the flexible nature thereof permits the same to be folded into a small size. Obviously, the thickness of the material from which the sack is formed largely controls the size of the bundle into which the sack may be folded.

From the foregoing, it will be seen that the present invention provides a sack for holding an infant within a stroller, baby carriage or the like, effectively and without any substantial possibility of the infant moving any undesired amount from a suitable position within the stroller or carriage. If it is desired to wrap the infant in one or more blankets before placing it within the sack 10, the dimensions of pocket 14 are such as to receive the infant and wrapping blankets, thus effectively retaining said blankets wrapped around the infant and substantially precluding the wiggling of the infant or jostling of the stroller or carriage resulting in the infant becoming unwrapped therefrom. The sack is quickly and easily positioned relative to the back of the stroller and the sack also may be removed from the stroller when desired with equal facility. No extra straps, hooks or other attaching means are required in order to maintain the sack in its operative position within the stroller or carriage, although the conventional cross-strap on the arms or sides of such vehicles will aid in retaining the sack and infant therein.

While the invention has been shown and illustrated in its preferred embodiment, and has included certain details, it should be understood that the invention is not to be limited to the precise details herein illustrated and described since the same may be carried out in other ways falling within the scope of the invention as claimed.

We claim:

1. An infant sack for use with a stroller and the like comprising in combination, an elongated substantially rectangular main panel of flexible material, a substantially flat pocket-forming panel of flexible material extending across one surface of said main panel and affixed at its side edges and one end to the side edges and one end of said main panel, a second substantially flat pocket-forming panel of flexible material extending across the opposite surface of said main panel and affixed at its side edges and one end to the side edges and opposite end of said main panel, thereby forming a pair of pockets opening toward each other but on opposite surfaces of said main panel, one of said pockets being shorter than the other and arranged to be pulled down over the upstanding back of a stroller and the like and the other pocket being arranged to receive and extend around the body of an infant and having a slit extending longitudinally from the open end thereof to facilitate placing an infant within said pocket, and fastening means connected to said other pocket adjacent said slit and operable to hold said slit closed.

2. An infant sack for use with a stroller and the like comprising in combination, an elongated main panel of flexible material, a plurality of pocket-forming panels of flexible material extending across and affixed at the side edges and each at an opposite end of said main panel on opposite surfaces thereof, whereby the closed ends of said pockets are at opposite ends of said main panel, said pockets opening toward each other and one pocket being arranged to be pulled down over the upstanding back of a stroller and the like so as to hold the sack positioned within the seat of said stroller and the other pocket then being positioned to receive and extend around the body of an infant so as to enclose it, and a third pocket overlying said back receiving pocket of said sack and opening in the opposite direction therefrom, said third pocket being disposed adjacent the rear surface of the back of said stroller when in use.

References Cited in the file of this patent

UNITED STATES PATENTS

| | | |
|---|---|---|
| 1,264,971 | Pickles | May 7, 1918 |
| 1,915,044 | Anderson | June 20, 1933 |
| 2,347,754 | Shay | May 2, 1944 |
| 2,679,282 | Anderegg | May 25, 1954 |